United States Patent Office 3,746,758
Patented July 17, 1973

3,746,758
PHOSPHINE OXIDE AND PHOSPHONYL DICHLO-
RIDES OF ALKYLATED p-HYDROXYPHENYL-
ALKANES
John Denon Spivack, Spring Valley, N.Y., assignor to
Ciba-Geigy Corporation, Ardsley, N.Y.
No Drawing. Continuation-in-part of application Ser. No.
618,988, Feb. 27, 1967, which is a continuation-in-part
of application Ser. No. 612,336, Jan. 30, 1967. This
application Sept. 30, 1970, Ser. No. 77,034
Int. Cl. C07f 9/02, 9/34, 9/42
U.S. Cl. 260—543 P        3 Claims

ABSTRACT OF THE DISCLOSURE

Phosphine oxides and phosphonyl dichlorides are prepared from alkylated p-hydroxyphenylalkyl halides and phosphorous halides in the presence of a complexing metal halide Lewis acid followed by dissociation of the reaction complex with water.

The phosphine oxides are useful as stabilizers of organic materials which are subject to oxidative deterioration.

The phosphonyl dichlorides are useful as intermediates in preparing the corresponding phosphonates which in turn are useful as stabilizers for organic materials which are subject to oxidative deterioration.

CROSS-REFERENCES

This is a continuation-in-part of a copending application Ser. No. 618,988, filed Feb. 27, 1967, now U.S. Pat. 3,534,127 which is a continuation-in-part of Ser. No. 612,336, filed Jan. 30, 1967, now U.S. Pat. No. 3,488,368.

This invention relates to novel alkylated hydroxyphenylalkylphosphine oxides and alkylated hydroxyphenylalkylphosphonyl dichlorides. The phosphine oxides are useful as stabilizers of organic materials which are subject to oxidative deterioration. The phosphonyl dichlorides are useful as intermediates in preparing the corresponding phosphonates which in turn are useful as antioxidants as discussed in greater detail in U.S. Pat. No. 3,280,070.

The alkylated hydroxyphenylalkylphosphine oxides and phosphonyl dichlorides of the present invention are represented by the formula:

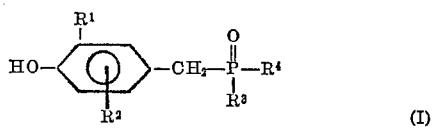

(I)

wherein $R^1$ is a lower alkyl group of from 1 to 6 carbon atoms;
$R^2$ is an alkyl group in a position ortho or meta to the hydroxy group, said alkyl group having up to 6 carbon atoms; and
$R^3$ and $R^4$ are each a chloro or phenyl group.

Illustrative examples of lower alkyl groups which are represented by $R^1$ and $R^2$ are methyl, ethyl, propyl, isopropyl, butyl, t-butyl, pentyl, hexyl and the like.

The alkylated hydroxyphenylalkylphosphine oxides of the present invention are useful as stabilizers of organic materials normally subject to oxidative deterioration. Such organic materials include: synthetic organic polymeric substances such as vinyl resins formed from the polymerization of vinyl halides or from the copolymerization of vinyl halides with unsaturated aldehydes and unsaturated hydrocarbons such as butadienes and styrene; polyolefins such as polyethylene, polypropylene, polybutylene, polyisoprene, and the like, including copolymers of polyolefins, polyurethanes and polyamides such as polyhexamethylene adipamide and poly-caprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials which can be stabilized by the compounds of the present invention include lubricating oil of the aliphatic ester type, i.e., di(2-ethylhexyl)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like hydrocarbon materials such as gasoline, mineral oil, fuel oil, drying oil, cutting fluids, waxes, resins, and the like, salts of fatty acids such as soaps and the like.

The alkylated hydroxyphenylalkylphosphonyl dichlorides of this invention are useful in making phosphonates such as di-n-octadecyl(3,5-di-tert.-butyl-4-hydroxybenzyl) phosphonate which can be used as an antioxidant.

In general, one or more of the stabilizers of the present invention are employed in amounts, in toto, of from about 0.005 to about 5% by weight of the composition to be stabilized. A particularly advantageous range of the present stabilizers is from about 0.05% to about 2%. The preferred range is particularly effective in polyolefins such as polypropylene.

The stabilizers employed in this invention can be also used in combination with other stabilizers or additives. Especially useful co-stabilizers are di-lauryl-beta-thiodipropionate and di-stearyl-beta-thiodipropionate.

The following formula represents co-stabilizers which are in certain instances very useful in combination with the stabilizers of this invention:

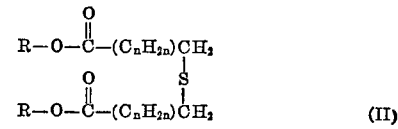

(II)

wherein R is an alkyl group having from 6 to 24 carbon atoms; and n is an integer from 1 to 6. The above co-stabilizers are used in the amount of from 0.01 to 2% by weight of the organic material, and preferably from 0.1 to 1%.

Other antioxidants, antiozonants, thermal stabilizers, ultraviolet light absorbers, coloring materials, dyes, pigments, metal chelating agents, etc. may also be used in the compositions in combination with the stabilizers of the invention.

The compounds of this invention can be prepared by reacting an alkylated hydroxyphenylalkyl halide of the formula

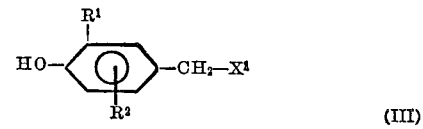

(III)

wherein $R^1$ and $R^2$ are as defined above, and $X^1$ is chloro, bromo or iodo, in a nonaqueous inert aprotic solvent, with a phosphorus halide (alternatively named as a halophosphine) of the formula

(IV)

wherein $X^2$ is chloro, and each of $R^2$ and $R^4$ is chloro, or phenyl, in the presence of a complexing metal halide Lewis acid. The resultant reaction complex is then treated with a quantity of water sufficient to at least dissociate the reaction complex and thereby liberate the phosphoryl compound. When the phosphorus halide reactant of Formula IV is a trichlorophosphine and the quantity of water employed is just sufficient to dissociate the reaction complex, the product will thus be a phosphoryl, or dichloride. If the phosphorus halide is a monohalophosphine, the product upon dissociation of the reaction complex will be a phosphine oxide.

With greater particularity to the nature of the reactants and conditions in preparing the compounds of the present invention, the alkylated hydroxyphenylalkyl halide reactant of Formula III can be a chloride, bromide or iodide, but preferably a chloride. The phenyl ring contains a hydroxy group in the para position and an alkyl group represented by $R^1$ on one of the adjacent carbon atoms. A second like or different alkyl group represented by $R^2$ is present on the other carbon atom adjacent to the hydroxy group or on the carbon atom meta to the hydroxy group and para to the first alkyl group. Generally, however, the alkyl groups contain a maximum of up to about 6 carbon atoms. The 3,5-di-t-butyl-4-hydroxyphenyl group is most preferred.

The phosphorus halide reactant of Formula IV is a trichloro phosphine or a monohalo phosphine, preferably chlorodiphenylphosphine.

The foregoing two reactants are generally employed in substantially equimolar amounts although an excess of the phosphorus halide can be employed. These reactants are combined with at least an equimolar amount, and generally a slight excess, of a complexing metal halide Lewis acid as for example aluminum chloride, ferric chloride, stannic chloride, boron trifluoride, titanium chloride, zinc chloride, zirconium chloride and the like. The process is preferably practiced by first dissolving or suspending the metal halide in a non-aqueous inert aprotic solvent such as nitromethane, dichloromethane, nitrobenzene, nitropropane, chlorobenzene, dichlorobenzenes, s-dichloroethane, tetrachloroethane, perchloroethylene, petroleum ether, carbon disulfide, toluene, and the like, generally at temperatures of 0° C. or lower, and then adding the two reactants to the reaction mixture. The reaction is then allowed to progress, with cooling if necessary, under an inert atmosphere such as nitrogen or helium and anhydrous conditions.

The reaction mixture containing the complexed intermediate is then treated with water. The water is added in a quantity just sufficient to dissociate the complex, rate of addition being adjusted to avoid an overly rapid generation of heat. The product is isolated through the use of conventional techniques such as solvent extraction, evaporation, centrifugation or the like and further purified if necessary through recrystallization, chromatography or the like.

The following examples are presented to further illustrate the present invention without introducing any limitation thereto.

EXAMPLE 1

Diphenyl 3,5-di-t-butyl-4-hydroxybenzylphosphine oxide

A solution of 14.7 g. of aluminum chloride (0.110 mole) in 50 ml. of nitromethane was added dropwise at −12° C. over a period of 20 minutes to a solution of 25.4 g. of 3,5-di-t-butyl-4-hydroxybenzyl chloride (0.100 mole) and 22.0 g. of chlorodiphenylphosphine (0.100 mole) in 50 ml. of nitromethane. The reaction mixture was stirred for 1 hour at −12° C. and 50 ml. of 6 N aqueous hydrochloride acid were then added dropwise from −10° to +10 C. One hundred milliliters of water were next added and the reaction mixture was stirred for about 1 hour to yield diphenyl 3,5-di-t-butyl-4-hydroxybenzylphosphine oxide which was collected by filtration and further purified through successive recrystallization from toluene and acetone, M.P. 177.5°–179° C.

EXAMPLE 2

3,5-di-t-butyl-4-hydroxybenzylphosphonyl dichloride

A solution of 14.7 g. of aluminum chloride (0.110 mole) in 50 ml. of nitromethane was added dropwise at −20° C. to −15° C. to a solution of 25.4 g. of 3,5-di-t-butyl-4-hydroxybenzyl chloride (0.100 mole) and 16.7 g. of phosphorus trichloride (0.125 mole) in 50 ml. of nitromethane. The reaction mixture was stirred at 15° C. for 30 minutes and 10.5 ml. of water was then added dropwise at −10° C. One hundred milliliters of toluene was next added and at the same temperature and the dispersion was centrifuged to remove the hydrated aluminum chloride salts. One hundred milliliters of n-heptane was then added, followed by water until the faint pink color disappears (about 2.5 ml.). The colorless solution was concentrated by evaporation in vacuum to yield 3,5-di-t-butyl-4-hydroxybenzylphosphonyl dichloride which was crystallized first from heptane and then from carbon tetrachloride, M.P. 109°–111° C.

EXAMPLE 3

Preparation of di-n-octadecyl 3,5-di-tert.-butyl-4-hydroxybenzylphosphonate

A molar equivalent of 3,5-di-tert.-butyl-4-hydroxybenzylphosphonyl dichloride of Example 2 is reacted with 2 molar equivalents of octadecanol in toluene solution in the presence of an acid acceptor, triethylamine. After removal of the triethylamine hydrochloride by filtration, the product is isolated by distillation of the toluene. On successive recrystallization from n-heptane and acetone, di-n-octadecyl 3,5-di-tert.-butyl-4-hydroxybenzylphosphonate is obtained as a white crystalline solid, M.P. 55°–57° C.

EXAMPLE 4

A water-white, refined (U.S.P. grade) mineral oil (Esso Primol D) was stabilized under the following test conditions.

A sample of the mineral oil (10 gms.) containing 0.1% by weight diphenyl 3,5-di-tert.-butyl-4-hydroxybenzylphosphine oxide was placed in a Sligh type oxidation flask filled with oxygen at room temperature (25° C.) and atmospheric pressure. Thereafter, the flask was sealed to form a system having a mercury manometer which measures the pressure changes as oxygen was absorbed by the sample in the flask. The sample was then heated at 150° C. until the manometer registered a decrease of 300 mm. Hg pressure within the flask with reference to the maximum pressure obtained at 150° C. The results are set out in Table II below:

TABLE II

| Percent concentration of stabilizer | Hours to failure at at 150° C. |
|---|---|
| Unstabilized oil | 2.5 |
| 0.1 | 17.6 |

What is claimed is:
1. A compound of the formula:

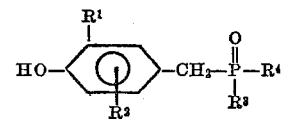

wherein
R$^1$ is a lower alkyl group of from 1 to 6 carbon atoms;
R$^2$ is an alkyl group in a position ortho or meta to the hydroxy group, said alkyl group having up to 6 carbon atoms; and
R$^3$ and R$^4$ are each chloro or phenyl group.

2. A compound according to claim 1 which is diphenyl 3,5-di-tert.-butyl-4-hydroxybenzylphosphine oxide.

3. A compound according to claim 1 which is 3,5-di-tert.-butyl-4-hydroxybenzylphosphonyl dichloride.

References Cited

UNITED STATES PATENTS 3,309,408 3/1967 Moedritzer _____ 260—606.5 P
3,402,196 9/1968 Dannels et al. ____ 260—543 PX LORRAINE A. WEINBERGER, Primary Examiner R. D. KELLY, Assistant Examiner U.S. Cl. X.R.

260—606.5 P, 45.7 PS, 45.7 P, 398.5; 99—163; 252—49.8